United States Patent
Heusslein

(10) Patent No.: US 11,697,096 B2
(45) Date of Patent: Jul. 11, 2023

(54) METHOD FOR TESTING INTEGRITY OF A FILTER MEDIUM

(71) Applicant: Pall Corporation, Port Washington, NY (US)

(72) Inventor: Ralph Heusslein, Steinbach (DE)

(73) Assignee: Pall Corporation, Port Washington, NY (US)

(*) Notice: Subject to any disclaimer, the term of this patent is extended or adjusted under 35 U.S.C. 154(b) by 49 days.

(21) Appl. No.: 17/389,830

(22) Filed: Jul. 30, 2021

(65) Prior Publication Data

US 2022/0072479 A1 Mar. 10, 2022

(30) Foreign Application Priority Data

Sep. 9, 2020 (EP) .................... 20 195 249.6

(51) Int. Cl.
- *B01D 65/10* (2006.01)
- *G01N 15/08* (2006.01)

(52) U.S. Cl.
CPC ....... *B01D 65/102* (2013.01); *G01N 15/0826* (2013.01); *G01N 2015/084* (2013.01)

(58) Field of Classification Search
CPC ...... B01D 65/00; B01D 65/10; B01D 65/102; G01N 15/00; G01N 15/08; G01N 15/0826; G01N 2015/084
See application file for complete search history.

(56) References Cited

U.S. PATENT DOCUMENTS

| | | | |
|---|---|---|---|
| 5,594,161 A | 1/1997 | Randhahn et al. | |
| 5,786,528 A | 7/1998 | Dileo et al. | |
| 6,324,898 B1 | 12/2001 | Cote et al. | |
| 6,938,460 B2 * | 9/2005 | Seiler | B01D 65/104 73/866 |
| 7,770,434 B2 * | 8/2010 | Brussermann | B01D 46/0012 73/38 |
| 8,689,610 B2 | 4/2014 | Grant et al. | |

(Continued)

FOREIGN PATENT DOCUMENTS

| | | | | |
|---|---|---|---|---|
| DE | 19503311 B4 * | 7/2011 | ........... | B01D 65/102 |
| EP | 2425886 B1 * | 6/2016 | ......... | B01D 46/0086 |
| FR | 2 894 843 A | 6/2007 | | |

*Primary Examiner* — Nguyen Q. Ha
(74) *Attorney, Agent, or Firm* — Leydig, Voit & Mayer, Ltd.

(57) ABSTRACT

An integrity testing method for a porous medium in a housing having an interior separated by the medium into upstream and downstream portions, an inlet and an outlet communicating, respectively, with the upstream and downstream portions, the outlet connected to a closeable conduit, comprises filling the downstream portion and conduit with liquid, draining the upstream portion and filling it with gas while retaining liquid in the downstream portion, connecting a gas-filled testing volume to the downstream portion, maintaining gas pressure of a predetermined testing differential pressure in the upstream portion, the differential pressure being lower than a predefined bubble point of the medium, determining the pressure in the testing volume, the testing volume selected such that, when a medium is tested having a bubble point corresponding to the predefined bubble point, a pressure increase within the testing volume of about 100 mbar or more is obtained within 10 minutes.

25 Claims, 10 Drawing Sheets

(56) References Cited

U.S. PATENT DOCUMENTS

| | | | |
|---|---|---|---|
| 9,095,801 B2 * | 8/2015 | Stering | B01D 46/0086 |
| 10,350,551 B2 * | 7/2019 | Armgart | G01N 15/0826 |
| 2020/0215493 A1 | 7/2020 | Assmann et al. | |
| 2023/0024189 A1 | 1/2023 | Summers et al. | |

* cited by examiner

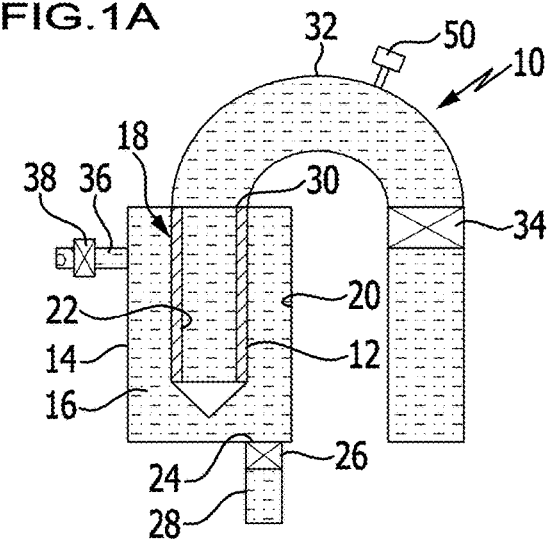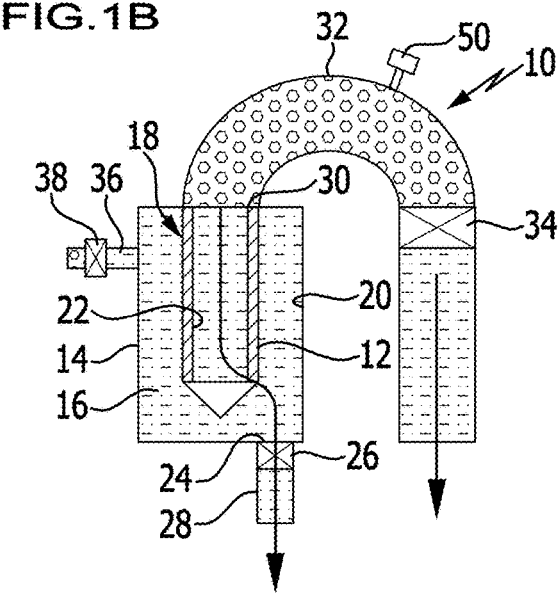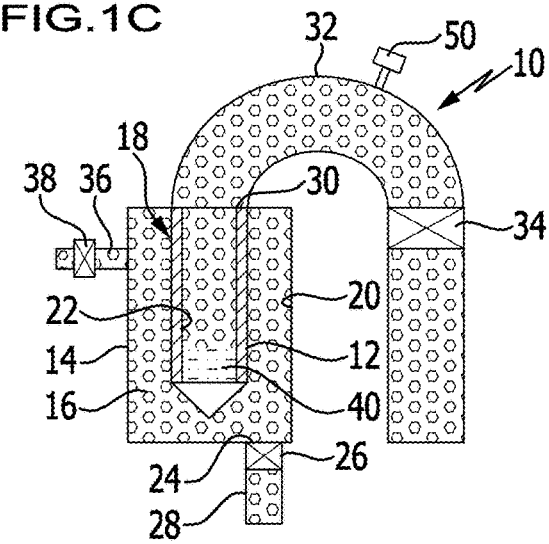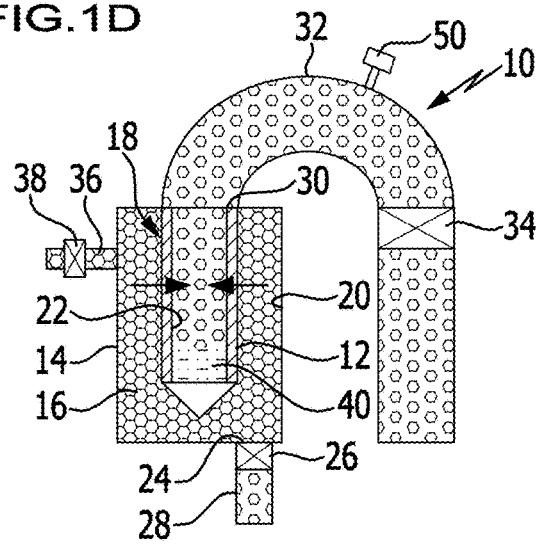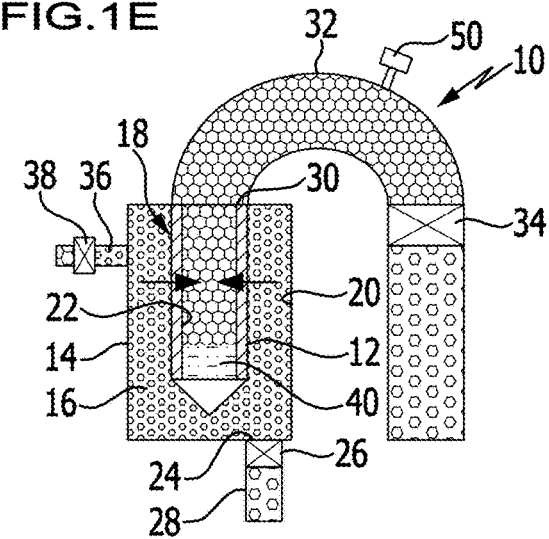

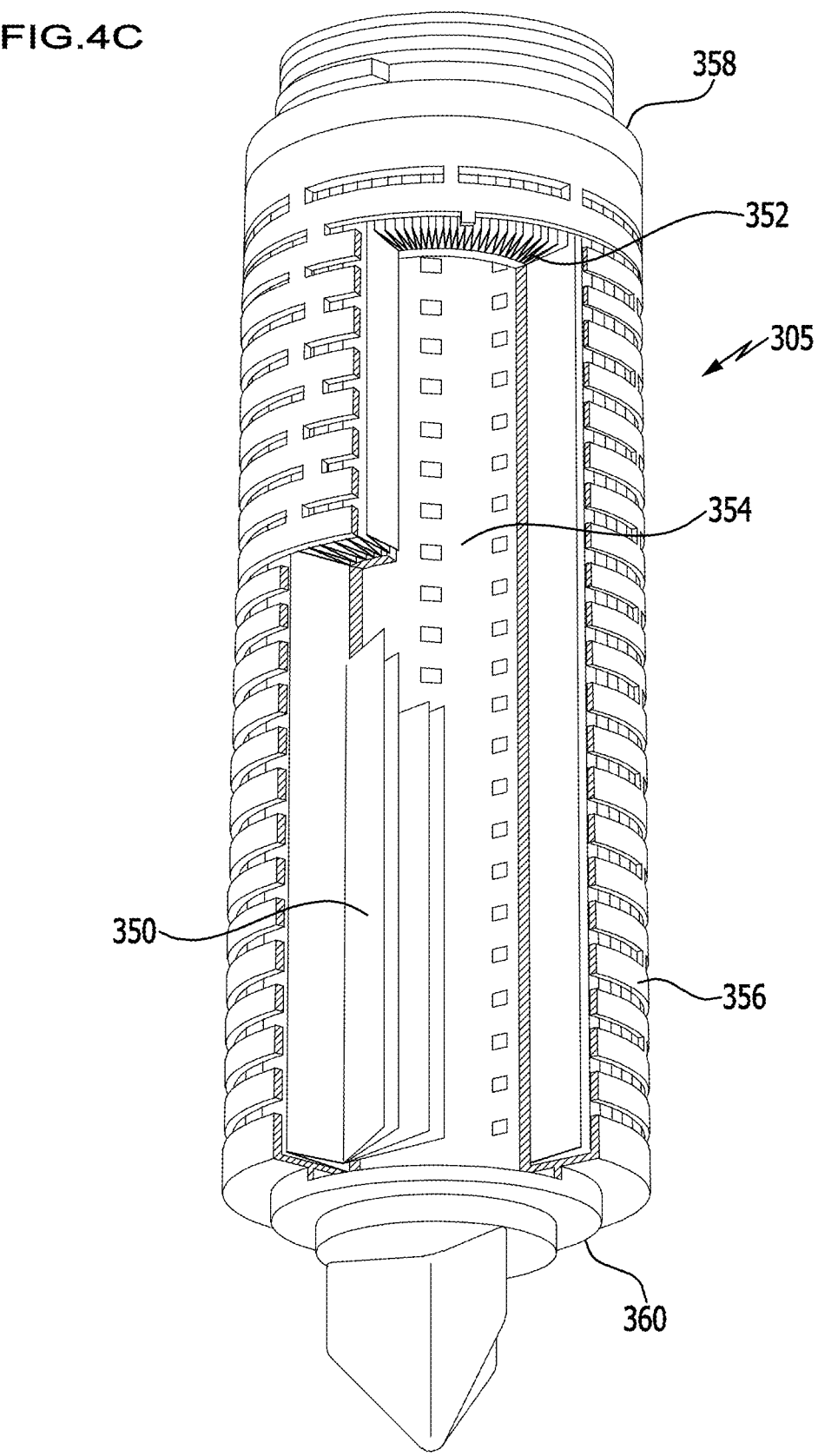

FIG.4D                    FIG.4E                    FIG.4F
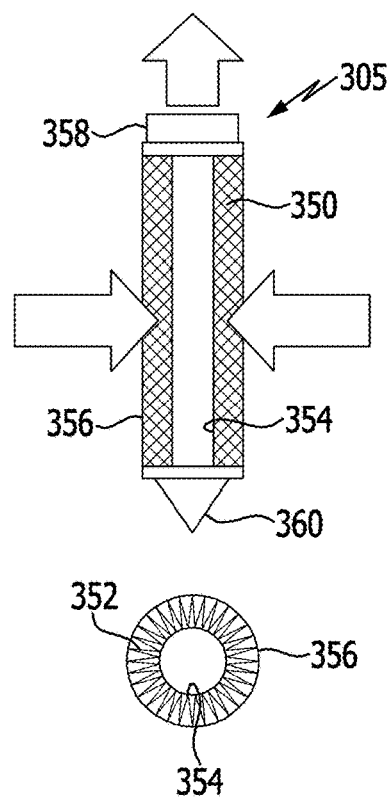
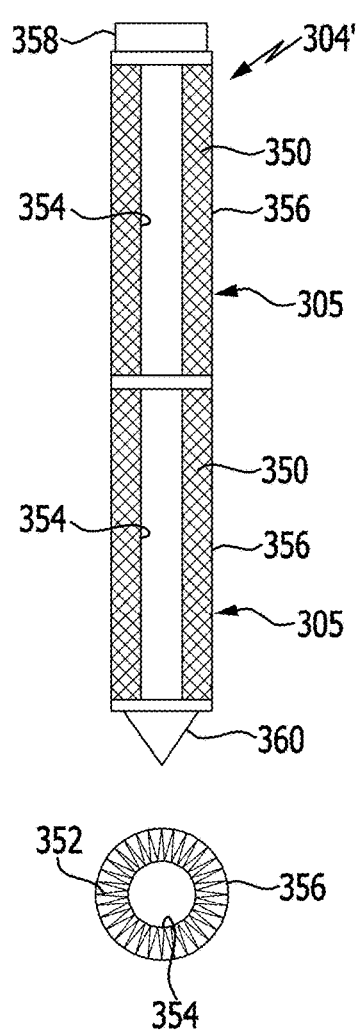
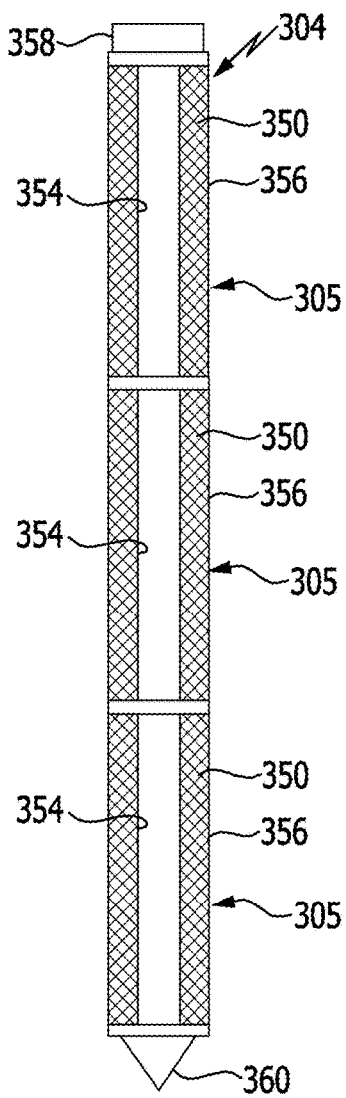
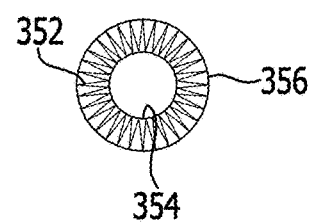

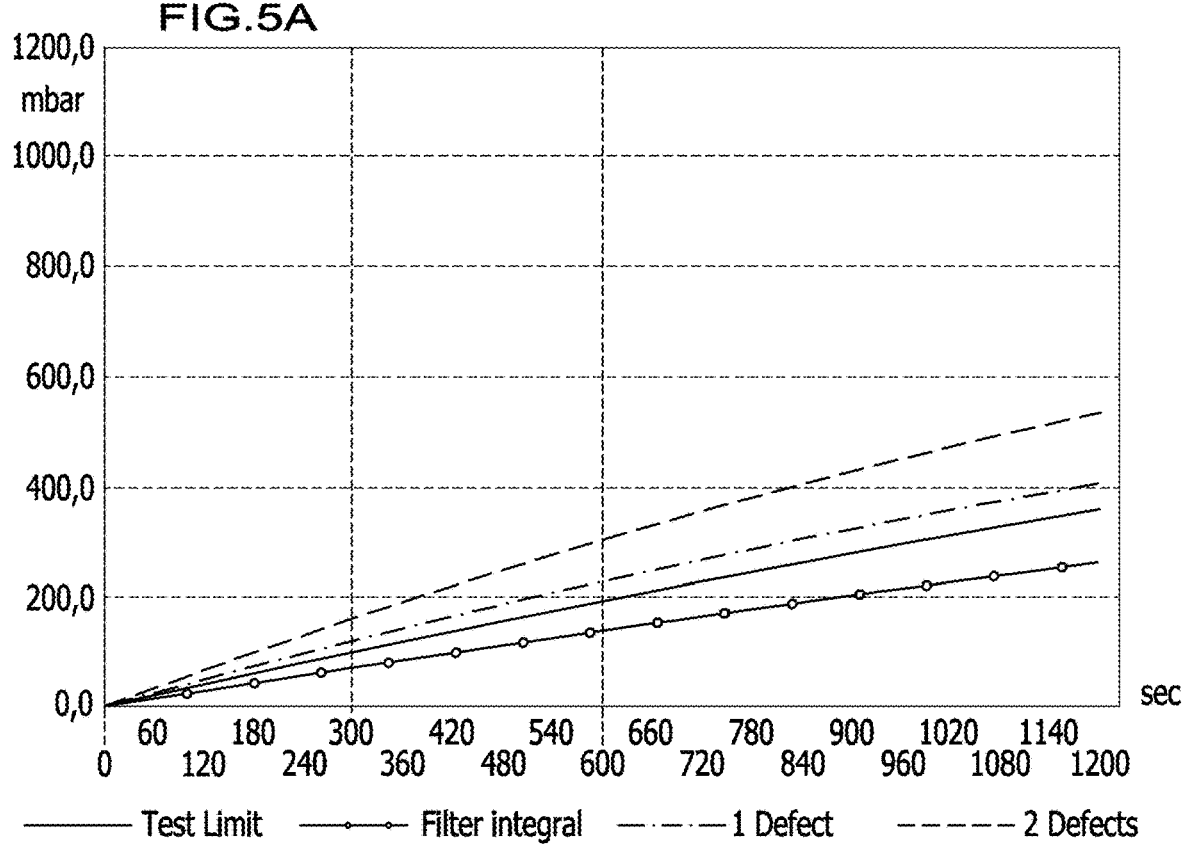
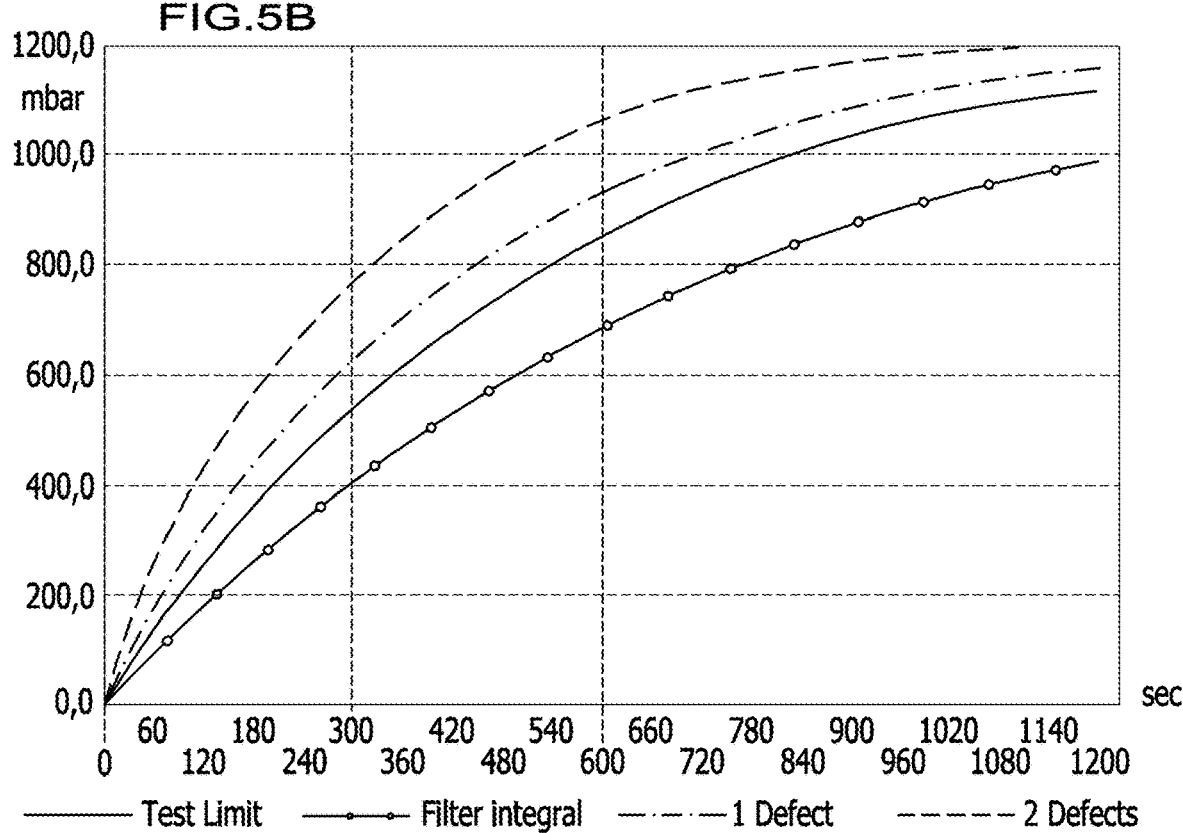

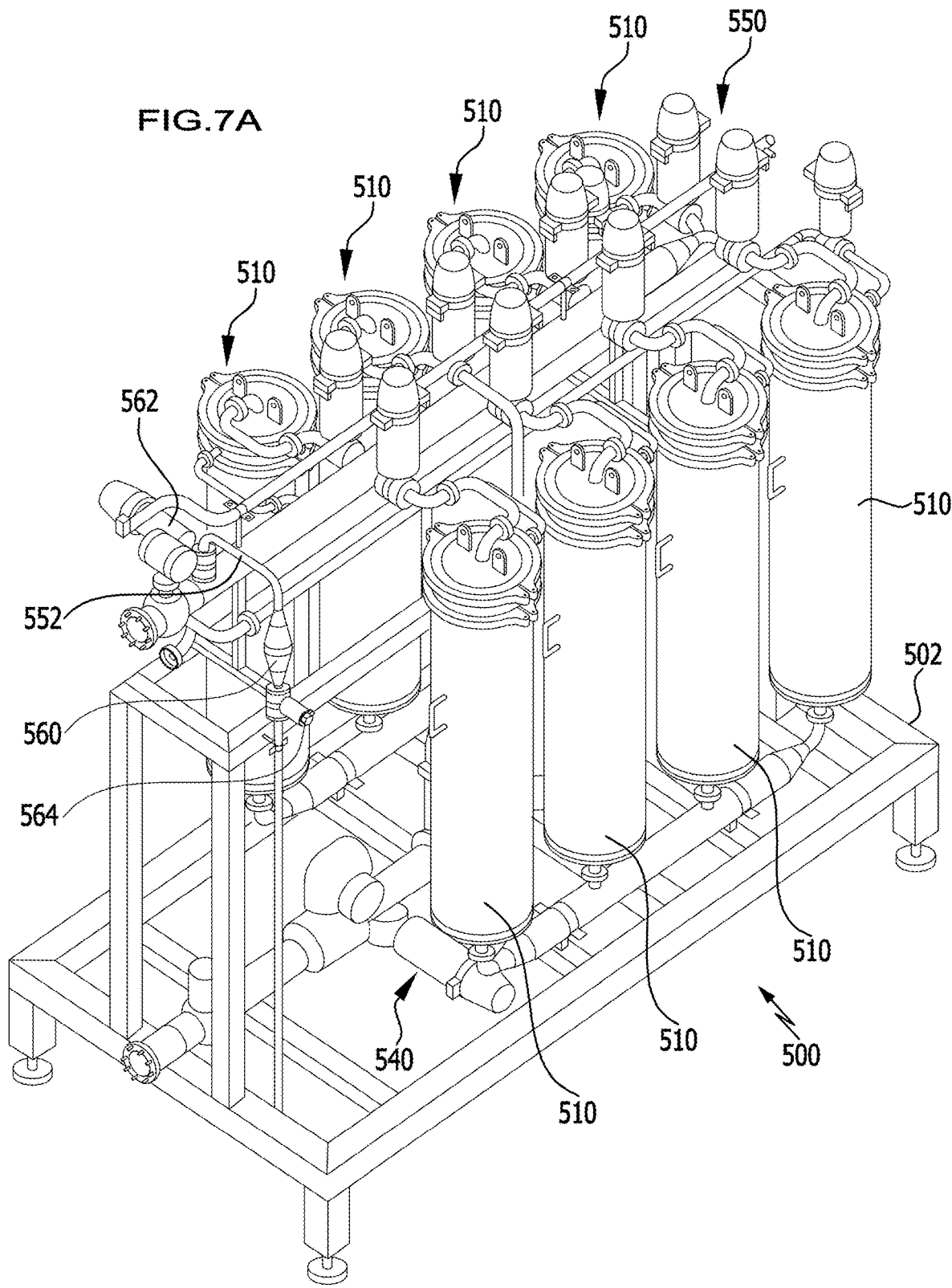

METHOD FOR TESTING INTEGRITY OF A FILTER MEDIUM

CROSS-REFERENCE TO RELATED APPLICATIONS

This patent application claims the benefit of under USC 119 of European Patent Application No. 20 195 249.6, filed Sep. 9, 2020, which is incorporated by reference.

BACKGROUND OF THE INVENTION

The present invention relates to a method for testing the integrity of a porous filter medium and an assembly for integrity testing.

Typically, porous filter media are used in filtration devices to eliminate undesired components from a liquid. In the field of pharmaceuticals, food and beverage processing and biotechnology industries, filter media have to comply with certain performance criteria. Integrity testing of the filter media provides a means for ensuring that a medium meets the validated performance criteria.

An integrity test used in the prior art is a gas-liquid diffusion test where the flow of gas through a wetted porous filter medium is measured. The porous filter medium is exposed to pressurized gas on its upstream side with a pressure below the bubble point of the porous filter medium. In case the porous filter medium meets the validated performance criteria and is free of defects, a relatively low flow rate of the gas will be observed since it is limited to the gas diffusion effect. In case the porous filter medium is defective, a substantially higher gas flow will be observed caused by a bulk gas flow through the defective portions of the porous filter medium.

The U.S. Pat. No. 8,689,610 B2 suggests a method for testing the integrity of a porous filter wherein a conduit is provided downstream of the filter to be tested and filled with a liquid. The conduit has a length to cross-sectional area ratio such as to substantially resist diffusive flow of the gas through the liquid downstream of the filter material. The wetted porous filter is exposed at its upstream side to pressurized gas, typically air or nitrogen, at a pressure lower than the bubble point of the porous filter. The gas pressure is slowly increased at a predetermined rate and the gas flow through the filter medium to be tested is measured by measuring the rate of liquid flow downstream of the sample. The liquid thus displaced is weighed and the gas flow is calculated based on the displaced liquid volume, thereby essentially eliminating the effect of diffusional gas flow. The results obtained are compared with the data corresponding to a non-defective filter.

A different approach for determining the integrity of a porous filter is disclosed in the U.S. Pat. No. 5,786,528 A. The method proposed uses a liquid that may be qualified as non-wetting for the porous filter to be tested. The non-wetting liquid is applied to the upstream side of the filter to be tested. The downstream side of the filter is void of liquid. For determining the integrity of the filter, an initial system volume and a volume change associated with pressuring the filter are used to determine composite flow rate changes and evaluate the same to distinguish between various flow components to accurately determine the pore size of the filter being tested or a filter defect. The latter is based on a second flow component representative of liquid intrusion into and leaking from the pores of said filter.

The U.S. Pat. No. 6,324,898 B1 suggests a method for testing the integrity of hollow fiber membranes. The method involves exposing a first side of the membranes to air while a second side remains exposed to water. A transmembrane pressure forces air through defects of the membranes. Air that passes through the membranes is collected and its amount is measured and compared to an acceptable amount of air to roughly indicate whether there is a significant defect in the set of membranes.

The methods for integrity testing of filter media known in the art often require a special testing environment and/or a considerable time for setting up the testing conditions and, thus, may typically not be performed with a filter assembly of an industrial scale without interrupting the industrial filtration process for an undue period of time and/or do not provide the required level of accuracy and reproducibility.

The object of the present invention is to provide a reliable integrity testing method also applicable to a filter assembly used in an industrial filtration process.

SUMMARY OF THE INVENTION

According to one aspect of the present invention, a method for testing the integrity of a porous filter medium is provided as set out in claim 1. The inventive testing method is designed as a nondestructive integrity testing procedure. Thus, the testing may be carried out in an assembly forming part of a regular filtration system and will allow resuming of filtration operation after integrity testing with a minimum of effort.

The porous filter medium having an upstream side and a downstream side is incorporated into a housing, said housing comprising an interior separated by the porous filter medium into an upstream portion at or adjacent to the upstream side of the filter medium and a downstream portion at or adjacent to the downstream side of the filter medium, said housing further comprising an inlet in fluid connection with the upstream portion and an outlet in fluid connection with the downstream portion of the interior, said outlet being connected to a filtrate conduit comprising a closable end remote from said outlet, and said porous filter medium having a predefined bubble point. The filter medium accommodated in said housing may be provided by a single filter element or multiple filter elements.

While the characteristics of a porous filter medium may be defined in various ways, e.g., by a mean pore size, mean flow rate, pressure drop etc., the bubble point is a parameter to define an important characteristic of the porous filter medium wetted by a liquid and may easily be determined. The bubble point may be determined according to a standard test method set out in ASTM F316-03(2019). The bubble point of a non-defective porous filter medium is addressed herein as the predefined bubble point. In the context of the description of the present invention, this term refers to a key parameter and an important target-setting for a porous filter medium. As the liquid selected to wet the filter medium during testing has, due to its surface tension, some effect on the resulting predefined bubble point, a predefined bubble point is linked to the type of testing liquid.

The method according to the present invention comprises the following steps:
  providing the porous filter medium in a state wherein the pores of the filter medium are wetted and filled with a liquid;
  providing the downstream portion of the interior of the housing and the filtrate conduit filled with a liquid so as to have gas displaced in the downstream portion of the interior and the filtrate conduit;
  closing the remote closable end of the filtrate conduit;

draining the upstream portion of the interior and filling same with a testing gas at least to such an extent that essentially the whole upstream side of the porous filter medium is exposed to the testing gas while retaining the liquid in the downstream portion of the interior;

providing a gas-filled testing volume fluidly connected to the downstream portion of the interior via said filtrate conduit filled with liquid;

providing a means for measuring the pressure in the downstream portion of the interior, e.g., a pressure sensor;

creating a pressure of the testing gas in the upstream portion of the interior corresponding to a predetermined testing differential pressure and maintaining it at such pressure level, said predetermined testing differential pressure being lower than the predefined bubble point of the porous filter medium;

determining the pressure of the gas within the testing volume indicated by the means for measuring the pressure after a predetermined period of time after the predetermined differential testing pressure has been established in the upstream portion of the interior of the housing.

The pressure determined is compared to a pressure obtained within the same period of time, e.g., ten minutes, when testing a non-defective filter medium. In case the pressure determined is higher by a predefined amount provided for a filter medium in a specific filtration environment, the integrity tested filter medium is qualified as defective.

In case the integrity testing is carried out in a filter assembly which is integrated in an industrial filtration system, in many occasions the downstream portion of the interior as well as the filtrate conduit may typically be completely filled with liquid (filtrate) and gas has already been displaced prior to starting of the filtration. According to one embodiment the filtrate will not be exchanged by another liquid and the further steps of integrity testing according to the present invention may be carried out immediately. The specific impact of the filtrate liquid on the predefined bubble point due to its surface tension has to be taken into account.

Once the closable end of the filtrate conduit has been closed it remains in such state until the end of the integrity testing.

The testing volume is selected according to the invention such that, when a filter medium is tested having a bubble point corresponding to the predefined bubble point, a pressure increase of about 100 mbar or more is obtained within a period of 10 minutes. This restriction of the size of the testing volume allows for an accurate and reproducible integrity testing and provides for a clear distinction within a reasonable period of time between filter media meeting the integrity criteria and filter media which may be regarded as defective.

The pressure of the gas within the testing volume may be monitored by placing the means for measuring the pressure, in the following also referred to as pressure sensor, in direct contact with the gas within the testing volume, however, the pressure sensor can likewise be arranged in contact with the liquid filling the downstream portion of the housing and filtrate conduit connected to the outlet of the housing upstream or downstream of the testing volume. Due to the incompressibility of the liquid under the relevant pressure conditions, the relevant pressure values indicated by the pressure sensor always sufficiently accurately reflect any pressure change in the testing volume.

The gas provided in the testing volume and the testing gas provided to the upstream portion may be the same or different. Thus, typically the gas in the testing volume will be selected from gas like nitrogen and air considered chemically neutral and not reacting with or dissolving to a measurable amount in the fluid.

While the change of pressure of the gas in the testing volume may be monitored continuously over time, according to the present invention, it is typically sufficient to measure the pressure of the gas in the testing volume only once after lapse of said predetermined period of time, e.g., several minutes after the pressure differential has been established.

According to another aspect of the present invention, a filter assembly for testing the integrity of a porous filter medium is provided, said assembly comprising one or more housings, each of said housing(s) incorporating an interior which is separated by the porous filter medium into an upstream portion at or adjacent to an upstream side of the filter medium and a downstream portion at or adjacent to a downstream side of the filter medium, said housing(s) further comprising an inlet in fluid connection with the upstream portion and an outlet in fluid connection with the downstream portion of the interior, said porous filter medium having a predefined bubble point;

a gas-filled testing volume fluidly connectable to the downstream portion(s) of the housing(s); a means for measuring the pressure of the gas within the testing volume;

a filtrate conduit providing a flow path extending from the outlet(s) of the interior(s) of the housing(s) to the testing volume, said filtrate conduit comprising a closable end remote from the outlet(s); and a pressure source suitable for creating a pressure of the testing gas in the upstream portion of the housing(s) corresponding to a predetermined testing differential pressure and maintaining it at such pressure level, said testing differential pressure being lower than the predefined bubble point of the porous filter medium.

The inventive assembly may be provided as a separate testing unit, but may also form a part of a broad variety of filter assemblies, not only on a laboratory scale but also on an industrial scale.

Moreover, the method according to the present invention may be carried out using a broad variety of liquids for wetting the filter medium and filling the downstream portion of the housing. Thus, there is no need to drain the liquid filtered in a regular filtration process in an industrial filtration assembly and replace it with a special testing liquid. In contrast, the filtered liquid (filtrate) may be retained in the wetted filter medium, in the downstream portion of the housing and the filtrate conduit connected to the outlet of the housing.

According to the present invention, the testing volume is limited to a relatively small volume, as noted above, and may be provided by connecting a special testing gas chamber to the downstream part of the assembly or, in the alternative, be provided in a part of the filtrate conduit downstream of the outlet of the housing. The small volume of the testing volume provides a higher accuracy of the integrity test. Furthermore, a meaningful test result may be obtained in a short period of, e.g., about 5 minutes.

In case a plurality of housings is present in the assembly to be tested, a common testing volume may be used, while the criteria for dimensioning the size of the testing gas volume are still determined as set out in general above.

The testing gas may be selected from a broad variety of testing gases. The only precondition is that the solubility of the testing gas in the liquid is relatively low such as to avoid a substantial interference with the testing procedure. Typically, nitrogen or air will be a preferred testing gas, especially for water or water-based liquids used for wetting the hydrophilic porous filter medium. In case of a poor wettability of the filter media, alcohol/water mixtures may be used. Again, nitrogen or air is a preferred suitable testing gas. As the bubble point of a filter medium depends on the liquid used for wetting same, the predefined bubble point has to be adjusted accordingly, depending on the liquid used for wetting the filter medium to be tested.

DETAILED DESCRIPTION OF THE INVENTION

Preferably, the testing volume is limited to a volume such that, when a filter medium is tested having a bubble point corresponding to the predefined bubble point, a pressure increase of the gas within the testing volume is obtained of about 0.1 to about 0.8 times, preferably of about 0.2 to about 0.6 times, of the predetermined testing differential pressure within a period of 10 minutes.

For example, when the testing differential pressure is at a level of 1240 mbar, the preferred pressure increase of about 120 mbar or more, preferably in the range of about 200 mbar to 500 mbar, is obtained upon lapse of a predetermined period of 10 minutes.

These limits for the testing volumes may easily be determined and, furthermore, provide testing conditions which allow a determination of the integrity of the filter media tested to be easily carried out in a reasonable period of time. Thus, the predetermined period may be set to a few minutes, e.g., five or ten minutes. Therefore, in case the integrity test is carried out in an industrial filtering system, the regular filtering process must be interrupted for only a short period of time, especially since under conditions where a suitable bubble point results from the liquid-media combination, the filtrate downstream of the filter medium need not be replaced by a different liquid. Still, the pressure increase in the testing volume makes it possible to clearly and accurately distinguish between defective and non-defective filter media.

As mentioned above already, the method according to the present invention may be carried out in a broad variety of environments and, thus, also in an environment wherein the housing forms a part of an industrial filtration system, in particular for filtering liquids in the field of food and beverage, chemistry, biotechnology and pharmaceuticals.

Especially in such cases, the liquid filling the downstream portion of the interior of the housing and the filtrate conduit may be the filtrate of a fluid regularly filtered in the filter assembly. This, again, saves time when the regular filtration operation is resumed.

Furthermore, the filter medium may be a membrane filter medium, in particular a hollow fiber membrane filter medium or a pleated membrane filter medium. According to a further aspect of the present invention, the porous filter medium may be provided in the form of a filter candle.

According to a preferred embodiment of the present invention, the testing gas is selected from inert gases, especially nitrogen, and air.

A small proportion of carbon dioxide included in regular air does not pose a problem since it will not negatively impact reproducibility, even though it may undergo to some extent a chemical reaction with the liquid present in the assembly. Also, the differences in solubility of the various testing gases identified above are tolerable since they do not noticeably affect the test results.

In accordance with the method of the present invention, the filtration assembly may comprise one or more additional housings, each having an interior and incorporating a porous filter medium, each interior being separated by the respective porous filter medium into an upstream portion at or adjacent to an upstream side of the filter medium and a downstream portion at or adjacent to a downstream side of the filter medium. Each housing has an outlet at the downstream portion of the interior, typically connected to a common tubing system, part of which forming the filtrate conduit(s). Preferably, a valve may be connected to each of the outlets, thus allowing the individual testing of the filter medium of each housing.

As noted above, the assembly may advantageously form a part of a filtration system, in particular of a filtration system of an industrial scale, e.g., for filtering liquids in the field of food and beverage, chemistry, pharmaceuticals and biotechnology.

Thus, there is no need to remove and separate a porous filter medium from its typical environment for testing.

Quite often, the filtering apparatus comprises two or more housings incorporating a porous filter medium, each housing having a valve connected to the outlet of the downstream portion. Thus, the porous filter medium/media incorporated in a housing may be set up for testing of each entity of a housing and filter medium/media contained therein separately.

According to a further aspect, the porous filter medium is provided in the form of a membrane filter medium, in particular a hollow fiber membrane filter medium or a pleated membrane filter medium.

Said housing/assembly typically comprises an inlet valve for fluidly connecting the upstream portion of the interior of the housing with a source of pressurized testing gas.

The assembly according to the present invention may comprise a valve for fluidly connecting and disconnecting the testing volume to the downstream portion(s) of the housing(s). Thus, the testing volume may be provided as integral part of an industrial filtration assembly and be selectively fluidly connected to the downstream portion of the interior(s) of the housing(s) when performing an integrity test according to the present invention.

Advantageously, the testing volume comprises an outlet for fluidly connecting the testing volume to the environment. The testing volume may therefore be flushed and/or drained and the pressure within the testing volume may be adjusted to predetermined testing conditions.

As noted before, the volume of the testing volume is preferably limited to a relatively small volume as compared to the volume of the assembly downstream of the filter medium/media. Even when designed for testing of large industrial filtration systems, typically the testing volume may be limited to about 10 L or less, more preferably about 5 L or less, most preferably about 2 L or less.

Alternatively, the testing volume may be provided by a portion of said filtrate conduit downstream of the housing(s) that may be delimited by an upstream valve and a downstream valve defining in between the testing volume. Such portion of the filtrate conduit preferably will be provided with an outlet such as to flush and/or drain said portion of the conduit and fill it with gas.

Preferably, each housing is provided at its upstream portion of the interior with a separate inlet and optionally a valve for feeding testing gas into the upstream portion during the performance of the inventive method.

These and further aspects and benefits of the present invention will become apparent from the drawings, the following detailed description of the drawings and the examples.

BRIEF DESCRIPTION OF THE DRAWINGS

FIGS. 1A to 1E schematically illustrate the sequence of testing steps in integrity testing according to the prior art;

FIGS. 4C to 4F show the filter elements of the filter assemblies of FIGS. 4A and 4B in detail;

FIGS. 5A and 5B show pressure/time diagrams of the results obtained in the Examples;

FIGS. 7A and 7B show a complex industrial filter system in a three-dimensional representation and in a partial cross-sectional view, set up as an assembly according to the present invention.

DETAILED DESCRIPTION OF THE INVENTION

Figure 2A:
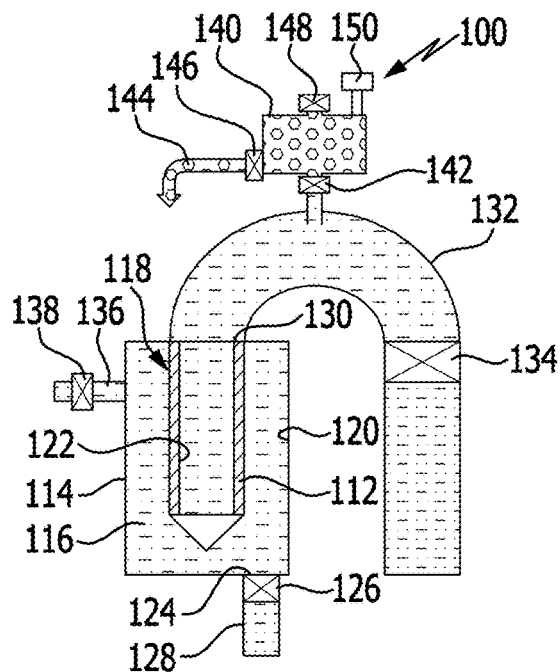
FIGS. 2A to 2D schematically illustrate the sequence of testing steps in integrity testing according to the present invention.

FIG. 1A schematically represents an assembly 10 for integrity testing a filter medium 12 according to a method as known in the prior art. The assembly 10 may also form part of a filter system (not shown here) and allow for filtration of a non-filtrate on an industrial scale.

The assembly 10 comprises a housing 14 having an interior 16 accommodating a filter element 18 which incorporates the filter medium 12 to be integrity tested. The filter medium 12 separates the interior 16 of the housing 14 into an upstream portion 20 and a downstream portion 22.

The housing 14 comprises in the upstream portion 20 of the interior 16 an inlet 24 where a valve 26 is provided to connect or disconnect the upstream portion 20 of the interior 16 to/from a feed line 28 providing non-filtrate.

The housing 14 comprises in the downstream portion 22 an outlet 30 through which filtrate may be drained from the downstream portion 22 into a filtrate conduit 32. The filtrate conduit 32 is typically provided with a valve 34 which allows to separate the assembly 10 from further equipment downstream (not shown here).

The upstream portion 20 of the interior 16 is furthermore provided with a testing gas inlet 36, which may be opened and closed via a valve 38 the purpose of which will be described below.

During regular filtration, the housing 14 with its upstream and downstream portions 20, 22 as well as the filtrate conduit 32 will be completely filled with liquid. The pressure level during regular filtration operation both in the upstream and the downstream portions 20, 22 typically ranges from about 1 bar to about 9 bar over ambient pressure.

When preparing for integrity testing, the assembly 10 is subjected to a cleaning and a flushing step in order to eventually regenerate the filter medium and have residues of the cleaning agent removed from the assembly 10. In a further step, the assembly 10 is filled with water. Such status is shown in FIG. 1A.

Subsequently, the assembly 10 is substantially fully drained via the opened valves 26, 34 as indicated by arrows in FIG. 1B. This step may be facilitated by an additional venting valve (not shown). However, care has to be taken to keep the filter medium 12 in a wetted state. The upstream portion 20 and the downstream portion 22 are drained via valve 26 and feed-line 28, whereas the volume of the filtrate conduit 32 is drained from the assembly 10 via valve 34.

FIG. 1C shows the assembly 10 in an essentially fully drained state just prior to the start of the integrity testing. As indicated in FIG. 1C, a minor amount of liquid 40 may be tolerated at the bottom part of the filter element 18, e.g., about 100 mL or less corresponding to about 10% or less of the downstream volume of a 30" filter cartridge often used in such applications.

Subsequently, the valves 26 and 34 are closed and the assembly 10 is now ready for integrity testing. Still, the filter medium 12 of the filter element 18 is kept in a wetted state.

As shown in FIG. 1D, when feeding testing gas via the inlet 36 into the upstream portion 20 of the interior 16, valves 34 and 38 are in an open state. An exemplary testing pressure is about 1.2 bar over ambient pressure, which, however, is still below the bubble point of the filter medium 12 (in this example about 1.6 bar) to be tested. The integrity testing is initiated by closing valve 34 after the testing pressure has been built up in the upstream portion 20.

Thus, the downstream portion 22 of the interior 16 is at first still under ambient pressure. Testing gas then enters into the downstream portion 22 of the interior through the wetted filter medium 12 by a gas diffusion process as the pressure differential across the filter medium 12 is below the pre-defined bubble point of the same. The pressure of the gas within the downstream portion 22 and the conduit 32 slowly increases as gas penetrates the filter medium, as indicated in FIG. 1E, while valve 34 is kept closed. The pressure in the downstream portion is detected by a pressure sensor 50. The pressure increase observed in the downstream portion 22 and the filtrate conduit 32 after a period of 10 minutes is substantially less than 100 mbar, depending on the volume available in the downstream portion 22 and the conduit 32.

In case the filter medium 12 is defective, the pressure increase will be somewhat more pronounced. Thus, it is possible to roughly evaluate the condition of the filter medium tested.

FIGS. 2A through 2D illustrate the steps of the method for integrity testing according to the present invention which provides a test result in a significantly shorter period and with a higher accuracy than the method according to the prior art.

FIG. 2A shows a filter assembly 100 for integrity testing a filter medium 112. The assembly 100 may also form part of a filter system (not shown here) and allow for filtration of a non-filtrate on an industrial scale.

The assembly 100 comprises a housing 114 having an interior 116 accommodating a filter element 118, which incorporates the filter medium 112 to be integrity tested. The filter medium 112 separates the interior 116 of the housing 114 into an upstream portion 120 and a downstream portion 122.

The housing 114 comprises in the upstream portion 120 of the interior 116 an inlet 124 where a valve 126 is provided to connect or disconnect the upstream portion 120 of the interior 116 to/from a feed line 128 providing non-filtrate.

The housing 114 comprises in the downstream portion 122 an outlet 130 through which filtrate may be drained from the downstream portion 122 into a filtrate conduit 132. The filtrate conduit 132 is provided with a valve 134 remote from the outlet 130 which makes it possible to separate the assembly 100 from further equipment downstream (not shown here).

The upstream portion 120 of the interior 116 is furthermore provided with a testing gas inlet 136 which may be opened and closed via a valve 138 the purpose of which will be described below.

During regular filtration, the housing 114 with its upstream and downstream portions 120, 122 as well as the conduit 132 will be completely filled with liquid as indicated in FIG. 2A. The pressure level during regular filtration operation, again, may be typically about 1 bar to about 9 bar over ambient pressure. So far, the assembly 100 corresponds to the assembly described with reference to FIG. 1A.

Furthermore, and in contrast to the assembly 10, the conduit 132 of the assembly 100 is provided with a chamber 140 filled with gas providing a limited testing volume which may be fluidly connected and disconnected to/from the conduit 132 by opening/closing a valve 142. Typically, the chamber 140 is provided with a drain 144 and a valve 146 for connecting/disconnecting the drain 144 to/from the chamber 140. Furthermore, the chamber 140 comprises a valve 148 for venting the chamber 140 to the environment. The camber 140 as shown in FIG. 2A has already been flushed and drained. During regular filtration operation, typically the pressure within the chamber 140 will be at ambient pressure while the valve 142 is closed and the valves 146 and/or 148 will be in an open state.

When preparing for integrity testing, the assembly 100 may be subjected to a cleaning and a flushing step in order to eventually regenerate the filter medium 112 and have residues of the cleaning agent removed from the assembly 100. In a further step, the assembly 100 is then typically filled with water to provide the filter medium 112 in a wetted state, and the downstream portion 122 of the interior 116 and the filtrate conduit 132 down to the valve 134 in a state where essentially any gas has been displaced. Such status is shown in FIG. 2A.

Figure 2B:
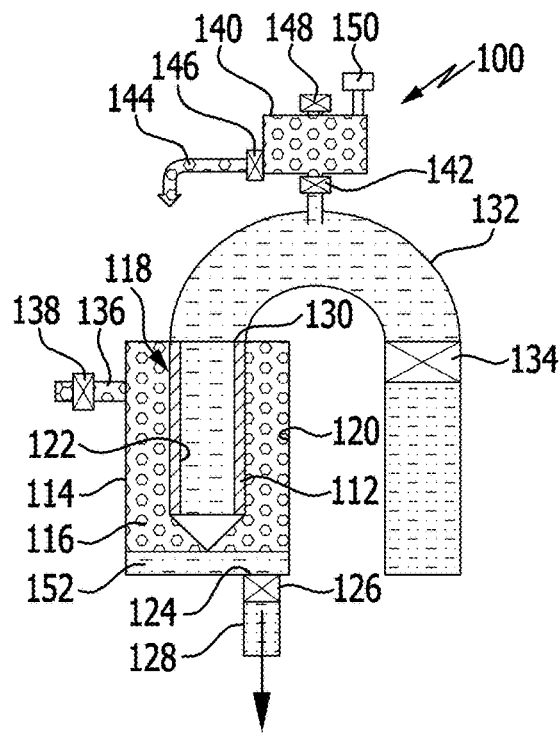

The upstream portion 120 of the interior 116 of the housing 114 of the assembly 100 is then fully drained via the opened valve 126 as indicated by the arrow in FIG. 2B. Draining may be facilitated by opening valve 138. However, care has to be taken to keep the filter medium 112 in a wetted state, which is facilitated by retaining the water in the downstream portion 122 and in the filtrate conduit 132. Thus, the valve 134 remains closed and the chamber 140 is still disconnected from the filtrate conduit 132 (valve 142 still remains closed). Due to the fact that only the upstream portion 120 has to be drained, the time for preparing the assembly 100 for integrity testing is already shorter. A minor amount of liquid 152 may remain within the upstream portion 120 of the interior 116.

Figure 2C:
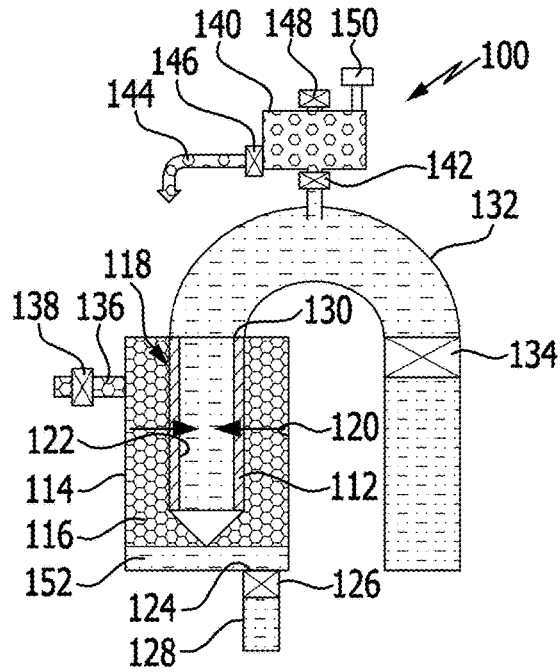
Figure 2D:
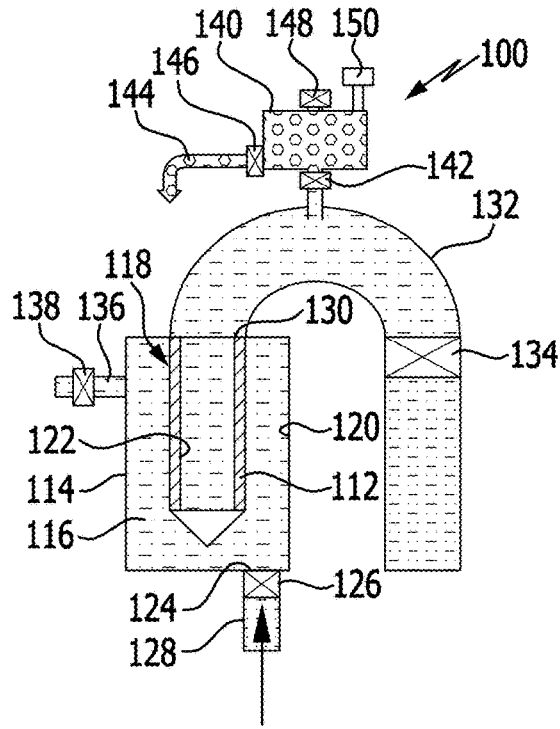

FIG. 2C shows the upstream portion 120 of the interior 116 of the housing 114 of the assembly 100 in a sufficiently drained state at the start of the integrity testing. The valve 126 is closed and testing gas will be fed into the upstream portion 120 of the housing 114 via the opened valve 138. A testing pressure differential is built up in the upstream portion 120 to a level below the predefined bubble point of the filter medium 112, e.g., amounting to about 80% of the predefined bubble point over ambient pressure. The pressure level of the testing gas in the upstream portion is maintained at such level. The chamber 140 provides a testing volume filled with gas at ambient pressure. Valves 146, 148 are kept in a closed state while valve 142 is subsequently opened.

Integrity testing begins by opening the valve 142, thus allowing diffusion of gas through the filter medium 112 into the downstream portion 122 of the interior 116 thereby increasing the downstream pressure level determined by a pressure sensor 150 which may be provided in fluid connection with the chamber 140 or in any other portion of the assembly 100 downstream of the filter medium 112, e.g., also in the conduit 132.

The testing volume is substantially limited as compared to the testing volume used according to the prior art. In the present example, it is limited to such an extent as compared to the method according to the prior art that a pressure increase in the testing gas of about 400 mbar or more is obtained within a time of 10 minutes after the testing has been started. Thus, a substantially more accurate testing result may be obtained in a shorter time.

In case the filter medium 112 is defective, the pressure increase will be significantly higher over time.

Once the integrity test has been completed, the filtration process may rapidly be resumed. Merely the testing chamber 140 will have to be fluidly disconnected from the assembly 100 by closing valve 142. The chamber 140 providing the testing volume may now be flushed and drained, if necessary, independently of the operation of the assembly 100.

Figure 3A:
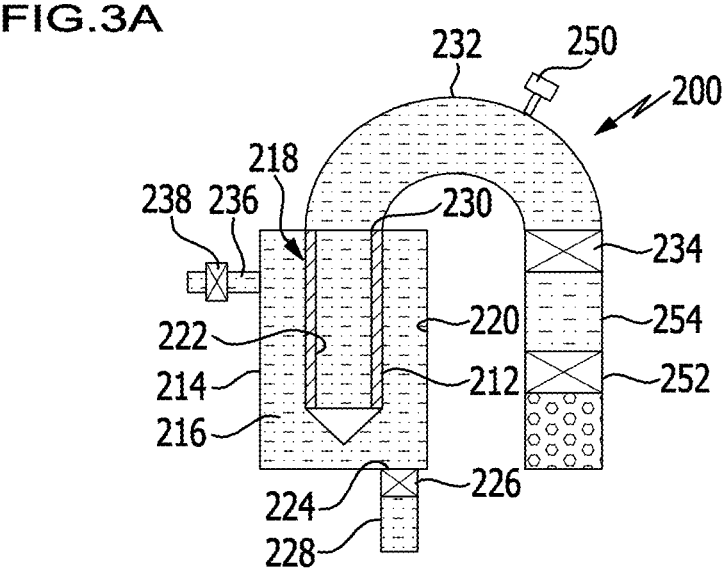
FIGS. 3A to 3C schematically illustrate a modification of the testing steps of FIGS. 2A to 2D.
Figure 3B:
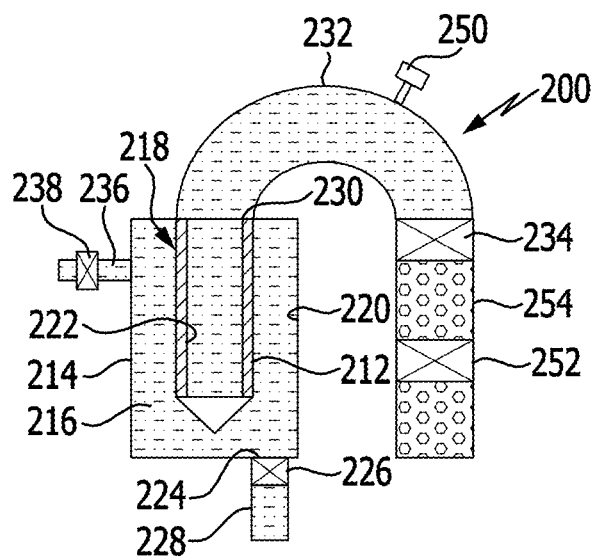

FIGS. 3A and 3B illustrate the steps of the method for integrity testing according to the present invention wherein the testing volume is provided in a different way as compared to the assembly 100 of FIGS. 2A to 2D.

FIG. 3A shows a filter assembly 200 for integrity testing a filter medium 212. The assembly 200 may also form part of a filter system (not shown here) and allow for filtration of a non-filtrate on an industrial scale.

The assembly 200 comprises a housing 214 having an interior 216 accommodating a filter element 218 which incorporates the filter medium 212 to be integrity tested. The filter medium 212 separates the interior 216 of the housing 214 into an upstream portion 220 and a downstream portion 222.

The housing 214 comprises in the upstream portion 220 of the interior 216 an inlet 224 where a valve 226 is provided to connect or disconnect the upstream portion 220 of the interior 216 to/from a feed line 228 providing non-filtrate.

The housing 214 comprises in the downstream portion 222 an outlet 230 through which filtrate may be drained from the downstream portion 222 into a filtrate conduit 232. The filtrate conduit 232 is typically provided at its closable end remote from the outlet 230 with a valve 234 which makes it possible to separate the assembly 200 from further equipment downstream (not shown here).

The upstream portion 220 of the interior 216 is furthermore provided with a testing gas inlet 236 which may be opened and closed via a valve 238 as described in connection with FIGS. 2A/2C and the operation of the valve 138 already.

During regular filtration, the housing 214 with its upstream and downstream portions 220, 222 as well as the conduit 232 will be completely filled with liquid. The pressure level during regular filtration operation, again, may be typically about 1 bar to about 9 bar over ambient pressure. So far, the assembly 200 corresponds to the assemblies of FIGS. 1A and 2A, respectively.

However, the assembly 200 is further provided with a valve 252 located on the filtrate conduit 232 downstream of the valve 234. The space 254 within the conduit 232 in between the two valves 234 and 252 serves as a chamber to provide a testing volume limited according to the present invention. During regular filtration operation of the assembly 200, the valves 234 and 252 remain open.

Once the upstream portion 220 has been drained similar to what has been shown and described already in connection with FIG. 2A, valve 234 is kept closed while valve 252 is opened to drain the liquid from the space in the conduit portion 254 and fill it with gas, typically at ambient pressure. Subsequently, valve 252 is closed again and now retains a predefined testing volume of gas within the assembly 200. Such status is shown in FIG. 3B.

Figure 3C:
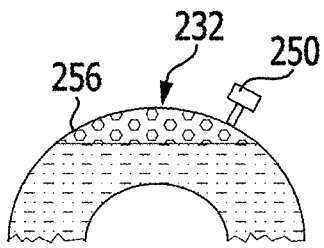

Upon integrity testing, valve 234 is opened to fluidly connect the testing volume of the conduit portion 254 with the downstream portion 222. Depending on the orientation of the assembly and its filtrate conduit 232, the gas of the testing volume may remain in the conduit portion 254, but otherwise may also be allowed to shift up, e.g., to a portion 256 of the filtrate conduit 232 as shown in FIG. 3C.

Again, the testing volume is substantially limited as compared to the testing volume used according to the prior art. In the present example, it is limited to such an extent as compared to the method according to the prior art that a pressure increase in the testing gas of about 400 mbar or more is obtained within a time of 10 minutes after the testing has been started. Thus, a more accurate testing result may be obtained in a shorter time.

EXAMPLES

Figure 4A:
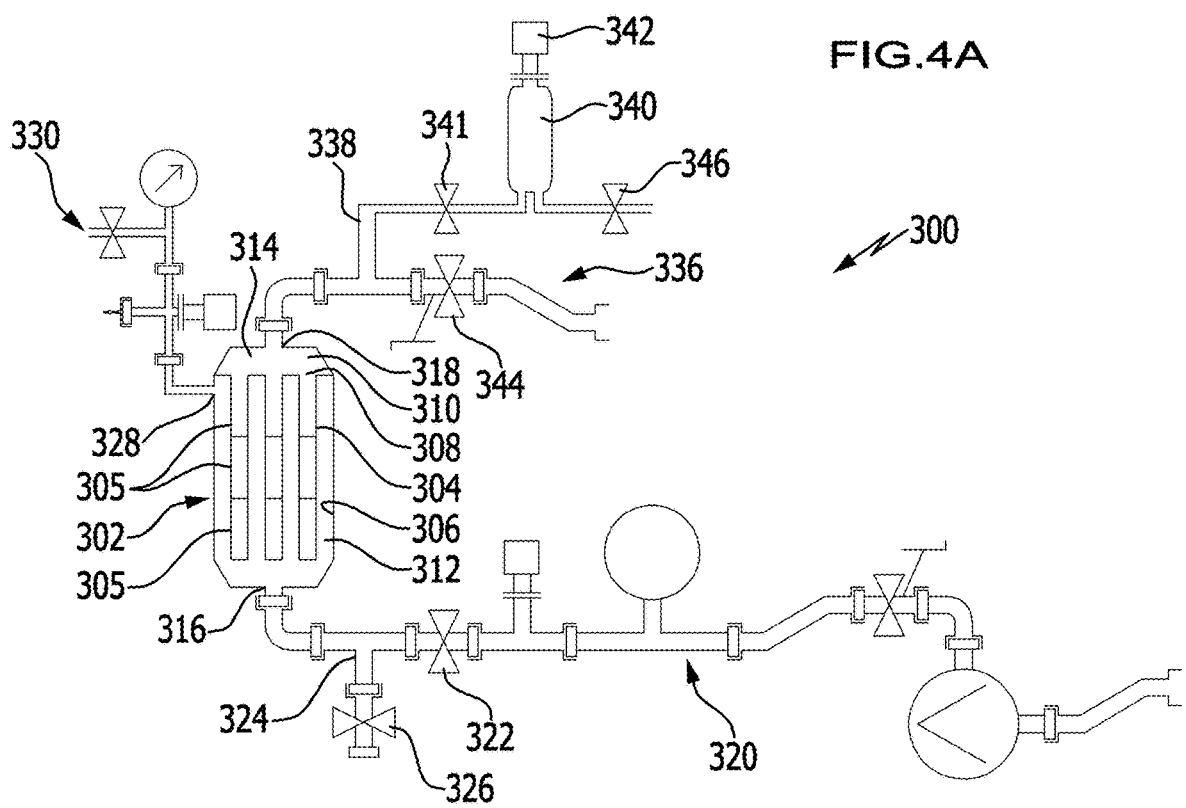
FIGS. 4A and 4B show a filtration assembly used in the following Examples.

An exemplary testing assembly 300 was set up as shown in FIG. 4A comprising a housing 302 incorporating six filter candles 304 in its interior 306 providing the filter medium to be tested. The interior of the housing has a volume of about 30 L.

In these specific examples, the filter candles 304 are of the type AB3BB7W32 (available as Pall BB Final Beer filter cartridges from Pall Corp. New York, U.S.A.). Each filter candle 304 comprises three axially aligned 10" (254 mm) long filter elements 305 providing for the filter medium in the form of a pleated polyethersulfone membrane. The filter elements 305 are characterized by a nominal filter area of 0.6 $m^2$ and a forward flow limit of 8 mL/min at a differential pressure of 1240 mbar. The bubble point of the filter medium of the filter candles 304 amounts to about 1600 mbar when testing in an aqueous medium (DI water). The overall forward flow limit of the set of six filter candles 304 (each including three 10" filter elements resulting in a candle length of 30") amounts to 144 mL/min at a testing differential pressure of 1240 mbar. The nominal filter area corresponds to 10.8 $m^2$.

The upstream portion 312 of the interior 306 is provided at the bottom end of the housing with an opening 316 or inlet for a fluid to be filtered. The downstream portion of the interior is provided with an outlet 318, designed for draining filtrate from the housing 302.

Connected to the inlet 316 is a piping system 320 providing a feed passage for non-filtrate during regular filtering operation. The piping system 320 comprises a valve 322 which may be closed to cut off further feed of non-filtrate.

The piping system 320 further includes a branch 324 including a further valve 326 which enables draining the fluid from the upstream portion 312 of the interior 306 of the housing 302. For draining the upstream portion 312 of the interior 306 of the housing 302, the valve 322 will be closed and the valve 326 opened.

The upstream portion 312 of the interior 306 of the housing 302 is provided at an upper portion of the housing 302 with a further inlet 328 connected to a pressure source 330. The pressure source 330 provides for testing gas and a pressure differential, as will be laid out below in more detail, and may, furthermore, be used to feed gas, e.g., testing gas, into the upstream portion 312 of the interior 306 in order to accelerate and complete drainage of non-filtrate out of the upstream portion 312 of the interior 306 of the housing 302 in preparation of integrity testing according to the present invention.

The outlet 318 of the downstream portion 314 of the interior 306 of the housing 302 is connected to a conduit 336 designed to receive the filtrate from the housing 302. The filtrate conduit 336 further includes a branch 338 to which a chamber 340 may be attached providing for gas in a testing volume. During regular filtration operation, the chamber 340 is cut off from the branch 338 by closing valve 341. Furthermore, a pressure sensor 342 is connected to the conduit 336. The portion of the filtrate conduit 336 downstream of the branch 338 may cut off by closing a valve 344.

Upon an initial installation of the assembly 300 the assembly may be flushed with deionized water which is fed into the assembly via valve 326 and branch 324 while valve 322 is closed. Care is taken to ensure that the filter medium of the filter candles 304 is completely wetted and air is discharged from the assembly via filtrate conduit 336 and, at the closable end thereof, via valve 344. At this time, the chamber 340 is cut off from the branch 338 by closing valve 341.

In preparation for integrity testing of the filter medium provided by the filter candles 304, valve 322 is closed and subsequently valve 326 is opened to drain the deionized water from the upstream portion of the interior. The valve 344 is typically closed during such process step and thus the filter medium of the filter candles 304 is maintained in a wetted state.

At this point, the downstream portion 314 of the interior 306 as well as the conduit 336 are at ambient pressure. The chamber 340 providing the testing volume is typically kept at ambient pressure by opening the valve 346.

Once drainage of the upstream portion 312 of the interior 306 is completed, the valve 326 is closed. Testing gas, in this example air, is introduced into the upstream portion 312 until a pressure differential of 1240 mbar is achieved corresponding to about 80% of the predefined bubble point of the filter medium (1600 mbar) of the filter candles 304. This (absolute) pressure level is maintained during the following testing procedure.

The valve 346 is closed and the valve 341 connecting the chamber 340 to the downstream conduit 336 is opened and the increase of the pressure of the gas of testing volume in chamber 340 is measured by the pressure sensor 342.

Figure 4B:
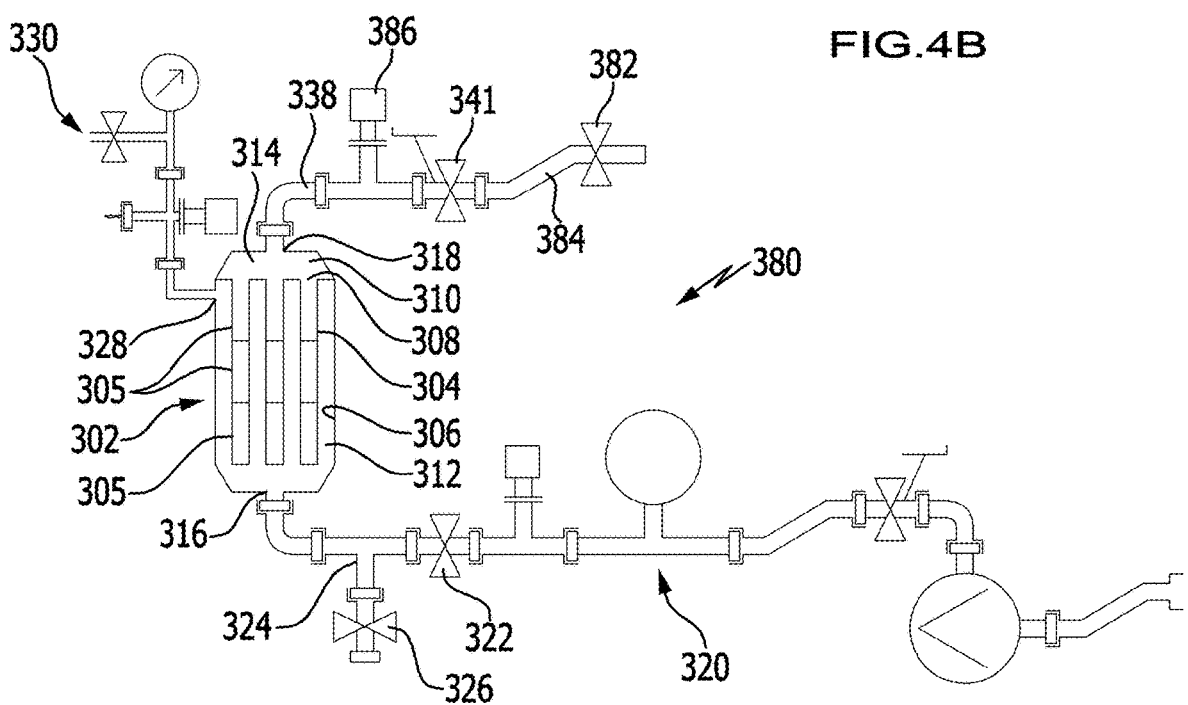

FIG. 4B shows an assembly 380 having a basic structure largely corresponding to the assembly 300. Therefore, the same reference numerals have been used and reference may be made to the above description of FIG. 4A in that regard.

However, the assembly 380 differs from the assembly 300 in that the test volume is provided by a section 384 of the conduit 338 delimited at its upstream end by valve 341 and at its downstream end by valve 382. Furthermore, the conduit 338 is provided with a pressure sensor 386.

In preparation of integrity testing according to the present invention, the section 384 of the conduit 338 is drained and filled with gas at ambient pressure. The volume of the section 384 is again limited such as to provide a significant pressure increase within a time limit of ten minutes.

A more detailed representation of the structure of the filter candles 304 and the filter elements 305 essentially making up for the filter candles is provided in FIGS. 4C, 4D and 4F which will be described in more detail below.

The filter candles 304 comprise a polyethersulfone membrane as a porous filter medium 350 in pleated form and are single open-ended. Their open ends 308 are sealingly mounted in openings of a wall part 310 transecting the interior 306 of the housing 302, and the filter candles 304 depend vertically from said wall part during regular filtration operation with their open ends 308 pointing upwards. The interior 306 of the housing is separated into an upstream portion 312 and a downstream portion 314 by the filter medium of the filter elements 305 of the filter candles 304.

A detailed structure of the filter elements 305 is provided in FIG. 4C. The filter element has a length of 254 mm (10") and provides the pleated filter medium 350 having a nominal filter area of 0.6 m$^2$. As noted above, the forward flow limit is at 8 mL/min at a differential pressure of 1240 mbar. The predefined bubble point of this filter medium is about 1600 mbar.

The pleated filter medium 350 is provided in a hollow cylindrical configuration, and the individual pleats 352 are radially arranged around an inner hollow grid like support structure 354. On the outer circumference of the pleated filter medium 350, a hollow grid-like support structure 356 is provided. The upper end 358 of the filter element 305 is open whereas the lower end is closed by an end cap 360.

FIG. 4D shows the filter element 305 schematically in two cross-sectional views (parallel and perpendicular to the longitudinal axis) and indicates with the arrows the fluid flow into and out of the filter element 305.

Two or more filter elements 305 may be axially aligned and sealingly connected to form filter candles 304', 304 as shown in FIGS. 4E and 4F, respectively. In such arrangements only the lowermost filter element 305 retains its end cap 360.

A filter candle may comprise one or more filter elements 305 in an axial arrangement. The filter candle shown in FIG. 4D consists of one filter element 305 only. The filter candle 304' shown in FIG. 4E comprises two axially aligned filter elements 305, whereas the filter candles 304 used in the assemblies of FIGS. 4A and 4B comprise three filter elements 305 in an axial alignment schematically represented in FIG. 4F.

For illustrative purposes, the pressure level measured by the pressure sensor 342 and 386 of the filter assemblies 300 and 380, respectively, over time is shown in the diagrams of FIGS. 5A and 5B. The values represented in FIG. 5A are based on a setting where the testing volume has been set to 6850 mL (chamber 340) whereas the values represented by FIG. 5B correspond to values measured with a testing volume of 1000 mL (conduit section 384) only.

FIGS. 5A and 5B illustrate the pressure increase at the downstream portion 314 which corresponds to the pressure increase in the conduit 338 and also the chamber 340 and the conduit section 384, respectively, over time for different settings:

The lowest curve represents the pressure increase actually measured for the assemblies 300, 380 when the filter media of all 18 filter elements 305 do not have any defect. The curve just above represents the pressure increase provided when the filter media of all filter elements are just within the upper limit of the validated forward fluid flow provided in the specification of the filter elements.

In case the filter medium of one of the filter elements 305 has a small defect (here represented by one pinch hole resulting in a forward gas flow of 70 mL/min) the pressure level will increase over time as represented by the third curve from the bottom. The uppermost curve demonstrates a scenario when two defects of such dimension would be present.

A comparison of the respective curves of the diagrams of FIGS. 5A and 5B demonstrates that an appropriate limitation of the testing volume according to the present invention clearly provides the benefit of obtaining meaningful and reliable integrity test results in a short period.

While the larger testing volume requires a measuring time of 10 minutes or more (cf. FIG. 5A), a clear distinction between integral and defective filter media may be possible already after 5 minutes once the testing volume is substantially reduced (cf. FIG. 5B).

Figure 6:
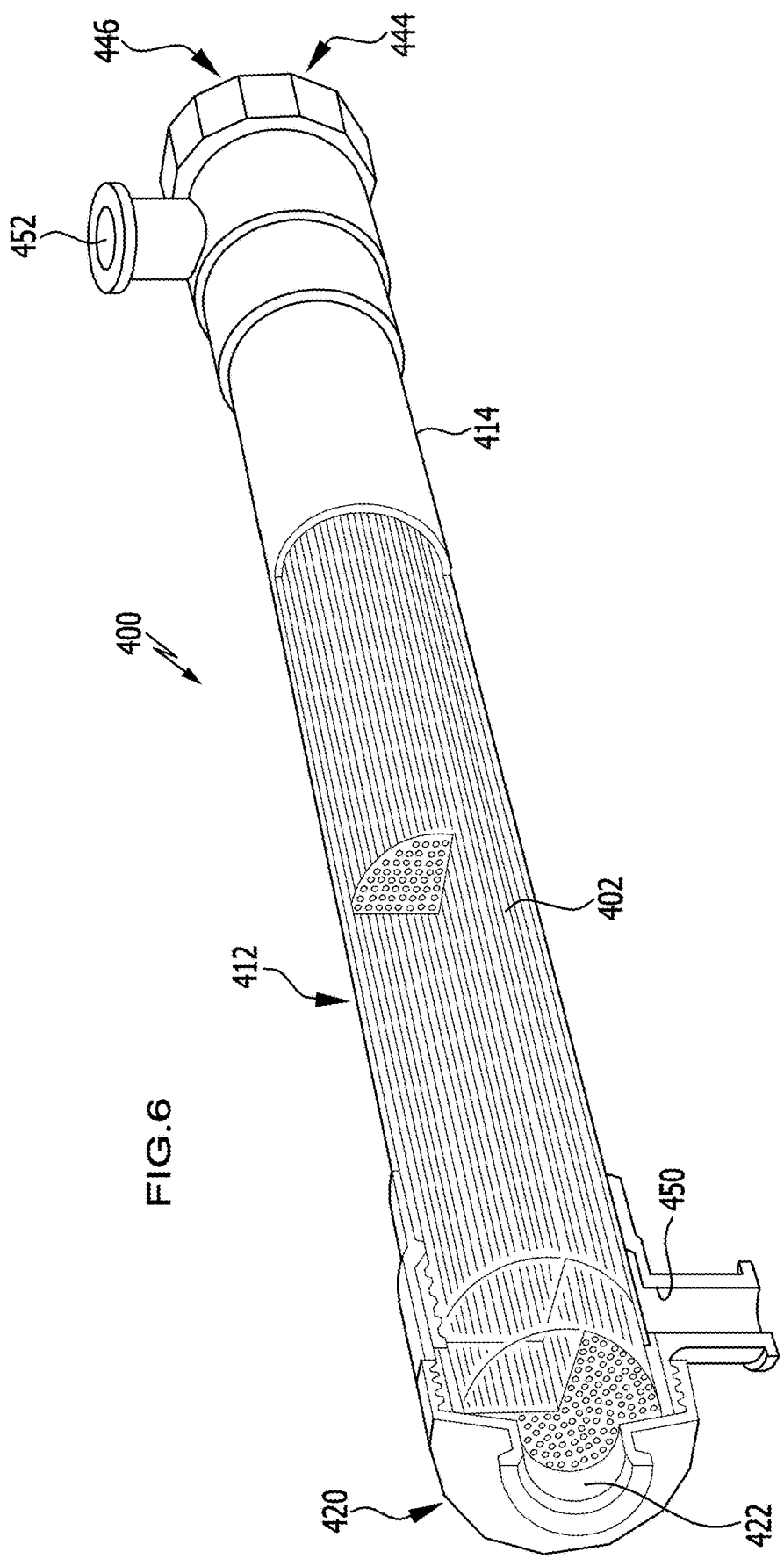
FIG. 6 shows another specific type of a filter element to be used and tested according to the present invention.

FIG. 6 shows a filter element 400 which may be used in any one of the assemblies 100, 200, 300 and 380 with some adaptations. The filter element 400 is designed for tangential flow filtration.

The filter element 400 comprises a filter medium provided by a multiplicity of hollow fiber membranes 402 which are arranged in parallel to one another to form a hollow fiber membrane bundle 412. The hollow fiber membrane bundle 412 is located in a hollow cylindrical housing 414 having at a first end 420 a feed inlet 422 and at an opposite second end 444 a retentate outlet 446.

The housing furthermore comprises two permeate outlets 450, 452 adjacent to the first and second ends 420, 444. When non-filtrate liquid enters the housing 414, it is directed into the individual hollow fibers 402 at their end adjacent to the feed inlet 422. The liquid flows within the hollow fibers 402 in the direction to the retentate outlet 446 while part of the liquid and/or of its components traverses the hollow fiber membranes 402 and is collected within the housing 414 and drained as permeate through the permeate outlets 450, 452.

A remaining part of the liquid is drained via the retentate outlet 446.

The filter element 400 and its filter medium, i.e., the hollow fiber membranes 402, may be integrity tested similar to the filter elements 305 described above. The only additional measure to be taken is to close the retentate outlet 446 so as to create a pressure differential upon testing across the membranes of the hollow fibers 402 only.

Other than that, only the afore-described measures for integrity testing are to be observed so as to put the invention into practice with respect to this type of filter medium.

Figure 7B:
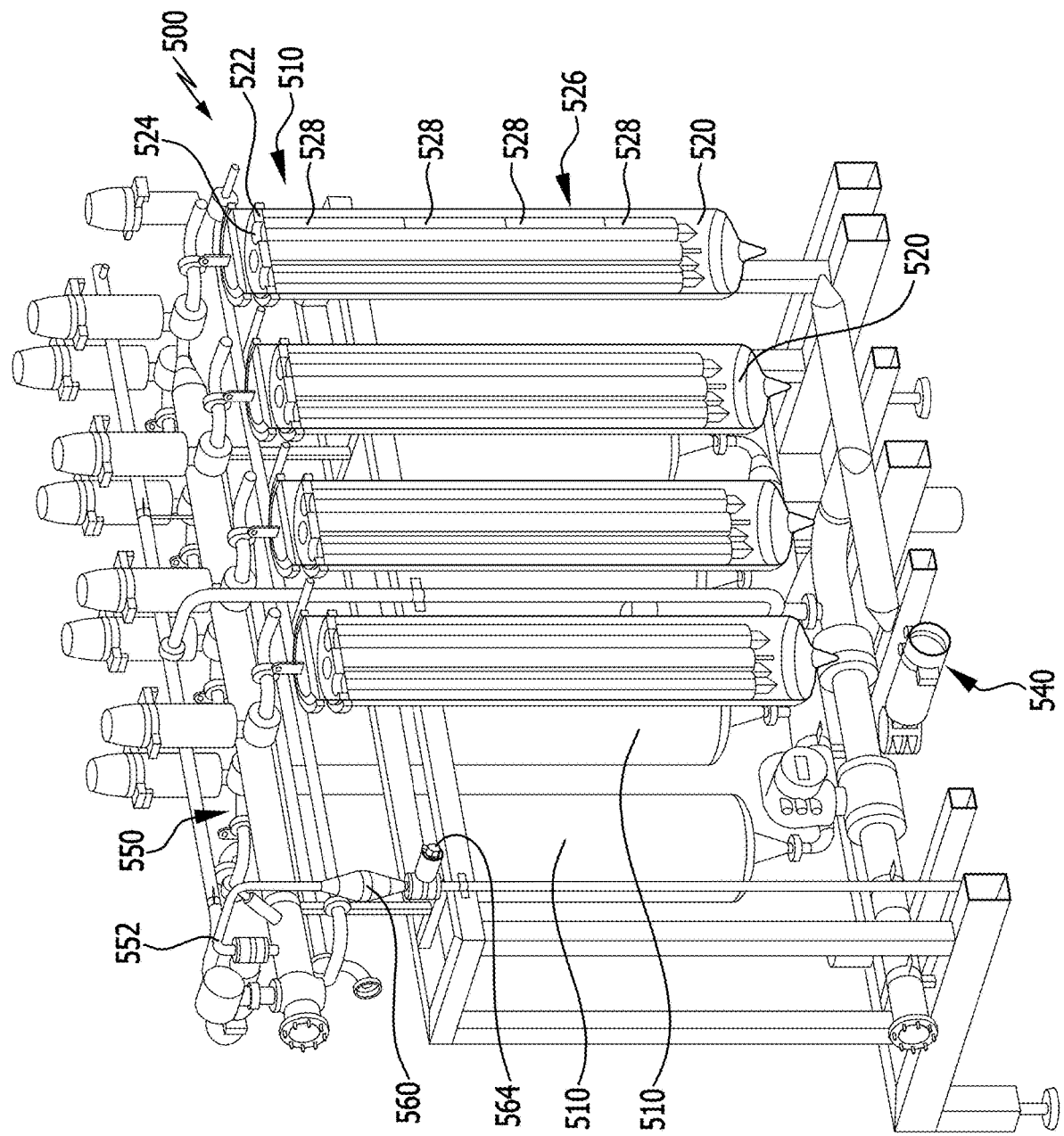

FIGS. 7A and 7B show an industrial scale filtration system 500, e.g., for beer filtration.

The system 500 is set up on a rack 502 and comprises eight filter assemblies 510 mounted on the rack 502 in two parallel rows. The filter assemblies 510 are set up similar to what has been described in the context of FIG. 4A with the difference of providing about 50% more filtration area per housing with seven filter candles each comprising four 10" (254 mm) long filter elements.

FIG. 7B shows a cross-sectional view of the system 500 wherein the interior 520 of the front row of the assemblies 510 is visible. Each assembly 510 comprises a housing 512 with an interior 520. In the upper portion of the interior 520, a separation wall 522 is located providing seven openings 524 designed to receive seven filter candles 526. Each filter candle 526 is set up from four axially aligned filter elements 528 similar to what has been shown and described in connection with FIG. 4F.

All of the assemblies 510 are connected at their lower ends to a common feed-line structure 540 by which non-filtrate is supplied to the assemblies 510.

All of the assemblies 510 are connected at their upper ends to a common filtrate conduit structure 550 receiving the filtrate from the filter assemblies 510. Typically, the system 500 is provided with a venting conduit 552 connected to the filtrate conduit structure 550 which allows venting the assemblies 510 and the filtrate conduit structure 550 and thus the downstream part of the system 500 as a whole.

The system 500 may be provided with a chamber 560, e.g., as shown in FIGS. 7A and 7B, where the chamber 560 forms a part of the venting conduit 552 providing a testing volume when integrity testing of the system has to be performed. Such chamber 560 forms a permanent part of the system 500. The section of the venting conduit 552 incorporating chamber 560 is typically provided with a valve 562 and a valve 564 and, thus, chamber 560 may be easily vented, flushed and drained.

According to a further alternative design of the system 500, the testing volume may be provided separate from the venting conduit 552 of the conduit structure 550 (not shown).

The system 500 of FIGS. 7A and 7B may provide for a nominal filter area of 130 m² in case the filter candles 526 are set up on the basis of the filter elements used in the embodiment of FIGS. 4A and 4B. The system 500 as a whole is capable of filtering beer at a rate of about 150 to about 250 hL/h. The maximum diffusive forward flow gas rate would then amount to somewhat more than 1.8 L/min if all assemblies 510 were to be tested simultaneously. Typically, such a setting is avoided and each assembly 510 is tested separately at a maximum diffusion forward flow gas rate of 224 mL/min. Upon integrity testing, each one of the assemblies 510 could be tested separately using the common testing volume 560.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A or B), unless otherwise indicated herein or clearly contradicted by context. The terms "comprising," "having," "including," and "containing" are to be construed as open-ended terms (i.e., meaning, "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indication any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

The invention claimed is:

1. A method for testing integrity of a porous filter medium having an upstream side and a downstream side, said porous filter medium being incorporated into a housing, said housing comprising an interior separated by the porous filter medium into an upstream portion at the upstream side of the filter medium and a downstream portion at the downstream side of the filter medium, said housing further comprising an inlet in fluid connection with the upstream portion and an outlet in fluid connection with the downstream portion of the interior, said outlet being connected to a filtrate conduit comprising a closable end remote from said outlet, and said porous filter medium having a predefined bubble point;

said method comprising:
providing the porous filter medium in a state wherein the pores of the filter medium are wetted and filled with a liquid;
providing the downstream portion of the interior of the housing and the filtrate conduit filled with a liquid so as to have gas displaced in the downstream portion of the interior and the filtrate conduit;
closing the remote closable end of the filtrate conduit;
draining the upstream portion of the interior and filling the upstream portion with a testing gas at least to such an extent that essentially the whole upstream side of the porous filter medium is exposed to the testing gas while retaining the liquid in the downstream portion of the interior;
providing a gas-filled testing volume fluidly connected to the downstream portion of the interior via said filtrate conduit filled with liquid, said gas-filled testing volume being selected such that, when a filter medium is tested having a bubble point corresponding to the predefined bubble point, a pressure increase of a gas within the gas-filled testing volume of about 100 mbar or more is obtained within a period of 10 minutes;
providing a means for measuring a pressure in the downstream portion of the interior;
creating a pressure of a testing gas in the upstream portion of the interior corresponding to a predetermined testing differential pressure and maintaining the pressure at the predetermined differential pressure, said predetermined testing differential pressure being lower than the predefined bubble point of the porous filter medium;
measuring pressure of the gas within the gas-filled testing volume within a predetermined time after the predetermined testing differential pressure has been established; and
comparing the measured pressure of the gas within the gas-filled testing volume to a pressure obtained within the predetermined time when testing a nondefective porous filter medium, wherein in case the measured pressure of the gas within the gas-filled testing volume is higher than a predefined pressure provided for the non-defective porous filter medium in a specific filtration environment, the porous filter medium under test is qualified as defective.

2. The method of claim 1, wherein the gas-filled testing volume is limited to a volume such that, when a filter medium is tested having a predefined bubble point, a pressure increase of the gas within the gas-filled testing volume is obtained of about 0.1 to about 0.8 times of the predetermined pressure differential within a period of 10 minutes.

3. The method of claim 2, wherein the gas-filled testing volume is about 0.2 to about 0.6 times of the predetermined pressure differential within a period of 10 minutes.

4. The method of claim 1, wherein testing gas is selected from the group consisting of inert gases, especially nitrogen, and air.

5. The method of claim 1, wherein the porous filter medium is provided in the form of one or more filter elements.

6. The method of claim 5, wherein the porous filter medium is in the form of a porous membrane filter medium, said porous membrane filter medium being a pleated membrane filter medium or a hollow fiber membrane filter medium.

7. The method of claim 1, wherein the filtration system comprises one or more additional housings, each of the one or more additional housings having an interior and incorporating a porous filter medium, each interior being separated by the respective porous filter medium into an upstream portion at an upstream side of the filter medium and a downstream portion at a downstream side of the filter medium; each having an outlet at its downstream portion.

8. The method of claim 7, wherein each of the one or more additional housings has a valve connected to the outlet of the downstream portion.

9. The method of claim 1, wherein the one or more housings form a part of an industrial filtration system.

10. The method of claim 9, wherein the industrial filtration system is for filtering liquids in the fields of food and beverage, chemistry, pharmaceuticals and biotechnology.

11. An assembly for testing the integrity of a porous filter medium, said assembly comprising:
one or more housings, each of said one or more housings comprising an interior separated into an upstream portion and a downstream portion; said one or more housings further comprising an inlet in fluid connection with the upstream portion and an outlet in fluid connection with the downstream portion of the interior,
a porous filter medium separating the interior of a housing into said upstream portion at an upstream side of the porous filter medium and said downstream portion at a downstream side of the porous filter medium, said porous filter medium being provided in the form of one or more filter elements, said porous filter medium having a predefined bubble point;
a gas-filled testing volume fluidly connectable to the downstream portion(s) of the one or more housings;
wherein the assembly comprises a valve for fluidly connecting and disconnecting the gas-filled testing volume to the downstream portion of each of the one or more housings;
a means for measuring a pressure of a gas within the gas-filled testing volume within a predetermined time;
a filtrate conduit providing a flow path extending from the outlet of the interior of each the one or more housings to the gas-filled testing volume, said filtrate conduit comprising a closable end remote from the outlet;
a pressure source suitable for increasing a pressure of a testing gas in the upstream portion of the one or more housings up to a predetermined testing differential pressure and maintaining the pressure at a predetermined pressure level, said predetermined testing differential pressure being lower than the predefined bubble point of the porous filter medium, and
a means for comparing a measured pressure of the gas within the gas-filled testing volume within the predetermined time to a pressure obtained within the predetermined time when testing a non-defective porous filter medium, wherein in case the measured pressure of the gas within the gas-filled testing volume is higher than a predefined pressure provided for the non-defective porous filter medium in a specific filtration environment, the porous filter medium under test is qualified as defective.

12. The assembly of claim 11, wherein the assembly forms a part of an industrial filtration system.

13. The assembly of claim 12, wherein the industrial filtration system is for filtering liquids in the fields of food and beverage, chemistry, pharmaceutical and biotechnology.

14. The assembly of claim 11, wherein the assembly further comprises two or more housings incorporating a porous filter medium, each of the one or more housings having a valve connected to the outlet of the downstream portion.

15. The assembly of claim 14, wherein the porous filter medium is selected from a pleated filter medium, a membrane filter medium and combinations thereof.

16. The assembly of claim 11, wherein the one or more filter elements are in the form of a filter candle.

17. The assembly of claim 16, wherein the porous filter medium is a hollow fiber membrane filter medium.

18. The assembly of claim 11, wherein said assembly comprises an inlet valve for fluidly connecting the upstream portion of each of the one or more housings with a source of pressurized testing gas.

19. The assembly of claim 11, wherein the gas-filled testing volume comprises an outlet for fluidly connecting the gas-filled testing volume to the environment.

20. The assembly of claim 11, wherein each housing is provided with a separate inlet and a valve for providing testing gas to the upstream portion of the interior of the one or more housings.

21. An assembly for testing the integrity of a porous filter medium, said assembly comprising:
one or more housings, each of said one or more housings comprising an interior separated into an upstream portion and a downstream portion; said one or more housings further comprising an inlet in fluid connection with the upstream portion and an outlet in fluid connection with the downstream portion of the interior,
a porous filter medium separating the interior of a housing into said upstream portion at an upstream side of the porous filter medium and said downstream portion at a downstream side of the porous filter medium, said porous filter medium being provided in the form of one or more filter elements, said porous filter medium having a predefined bubble point;
a gas-filled testing volume fluidly connectable to the downstream portion(s) of the one or more housings;
a means for measuring a pressure of a gas within the gas-filled testing volume within a predetermined time;
a filtrate conduit providing a flow path extending from the outlet of the interior of each the one or more housings to the gas-filled testing volume, said filtrate conduit comprising a closable end remote from the outlet;
wherein the gas-filled testing volume is provided in a portion of said filtrate conduit, said filtrate conduit portion being delimited by an upstream valve and a downstream valve defining in between the gas-filled testing volume;
a pressure source suitable for increasing a pressure of a testing gas in the upstream portion of the one or more housings up to a predetermined testing differential pressure and maintaining the pressure at a predetermined pressure level, said predetermined testing differential pressure being lower than the predefined bubble point of the porous filter medium, and a means for comparing a measured pressure of the gas within the gas-filled testing volume within the predetermined time to a pressure obtained within the predetermined time when testing a non-defective porous filter medium, wherein in case the measured pressure of the gas within the gas-filled testing volume is higher than a predefined pressure provided for the non-defective porous filter medium in a specific filtration environment, the porous filter medium under test is qualified as defective.

22. An assembly for testing the integrity of a porous filter medium, said assembly comprising:
   one or more housings, each of said one or more housings comprising an interior separated into an upstream portion and a downstream portion; said one or more housings further comprising an inlet in fluid connection with the upstream portion and an outlet in fluid connection with the downstream portion of the interior,
   a porous filter medium separating the interior of a housing into said upstream portion at an upstream side of the porous filter medium and said downstream portion at a downstream side of the porous filter medium, said porous filter medium being provided in the form of one or more filter elements, said porous filter medium having a predefmed bubble point;
   a gas-filled testing volume fluidly connectable to the downstream portion(s) of the one or more housings;
   a means for measuring a pressure of a gas within the gas-filled testing volume within a predetermined time;
   a filtrate conduit providing a flow path extending from the outlet of the interior of each the one or more housings to the gas-filled testing volume, said filtrate conduit comprising a closable end remote from the outlet;
   a pressure source suitable for increasing a pressure of a testing gas in the upstream portion of the one or more housings up to a predetermined testing differential pressure and maintaining the pressure at a predetermined pressure level, said predetermined testing differential pressure being lower than the predefmed bubble point of the porous filter medium,
   a means for comparing a measured pressure of the gas within the gas-filled testing volume within the predetermined time to a pressure obtained within the predetermined time when testing a non-defective porous filter medium, wherein in case the measured pressure of the gas within the gas-filled testing volume is higher than a predefined pressure provided for the non-defective porous filter medium in a specific filtration environment, the porous filter medium under test is qualified as defective, and,
   wherein said gas-filled volume is selected such that, when a filter medium is tested having a bubble point corresponding to the predefmed bubble point, a pressure increase of the gas within the gas-filled testing volume of about 100 mbar is obtained within a period of 10 minutes.

23. The assembly of claim 22, wherein the assembly comprises a valve for fluidly connecting and disconnecting the gas-filled testing volume to the downstream portion of each of the one or more housings.

24. The assembly of claim 22, wherein the gas-filled testing volume is provided in a portion of said filtrate conduit, said filtrate conduit portion being delimited by an upstream valve and a downstream valve defmed in between the gas-filled testing volume.

25. The assembly of claim 24, wherein the filtrate conduit comprises an outlet.

* * * * *

UNITED STATES PATENT AND TRADEMARK OFFICE
CERTIFICATE OF CORRECTION

| | |
|---|---|
| PATENT NO. | : 11,697,096 B2 |
| APPLICATION NO. | : 17/389830 |
| DATED | : July 11, 2023 |
| INVENTOR(S) | : Ralph Heusslein |

It is certified that error appears in the above-identified patent and that said Letters Patent is hereby corrected as shown below:

In the Claims

In Column 16, Claim 1, Line 55, please replace "predefmed" with "predefined".

In Column 16, Claim 2, Line 61, please replace "predefmed" with "predefined".

In Column 18, Claim 21, Line 47, please replace "predefmed" with "predefined".

In Column 18, Claim 21, Line 59, please replace "defming" with "defining".

In Column 18, Claim 21, Line 66, please replace "predefmed" with "predefined".

In Column 19, Claim 22, Line 25, please replace "predefmed" with "predefined".

In Column 20, Claim 22, Line 4, please replace "predefmed" with "predefined".

In Column 20, Claim 22, Line 18, please replace "predefmed" with "predefined".

In Column 20, Claim 24, Line 29, please replace "defming" with "defining".

Signed and Sealed this
Twenty-sixth Day of September, 2023

Katherine Kelly Vidal
*Director of the United States Patent and Trademark Office*